Figures 1, 2:
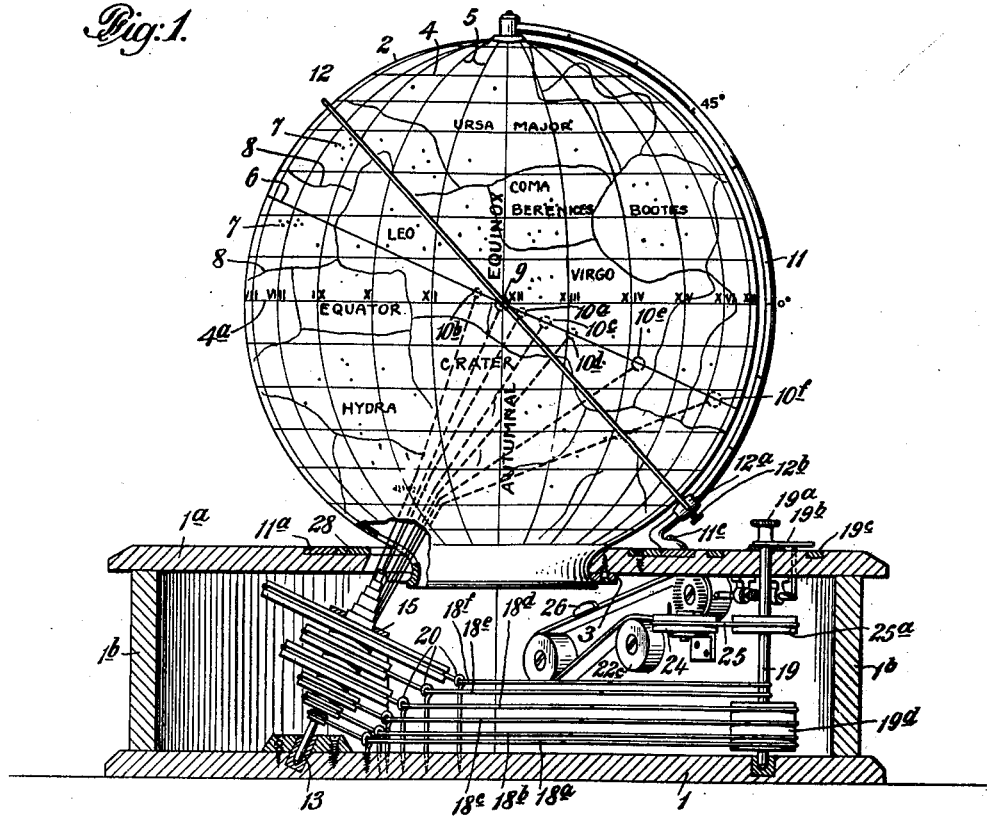

March 20, 1934.　　　O. J. RUSSERT　　　1,952,024
EDUCATIONAL APPARATUS
Filed June 1, 1931　　　2 Sheets-Sheet 1

INVENTOR
Otto J. Russert
BY
Lawrence K. Sager
his ATTORNEY

March 20, 1934.  O. J. RUSSERT  1,952,024

EDUCATIONAL APPARATUS

Filed June 1, 1931  2 Sheets-Sheet 2

INVENTOR
Otto J. Russert
BY
Lawrence K. Sager
his ATTORNEY

Patented Mar. 20, 1934

1,952,024

UNITED STATES PATENT OFFICE 1,952,024

EDUCATIONAL APPARATUS

Otto J. Russert, Schenectady, N. Y., assignor of one-half to Lawrence K. Sager, Palisade, N. J.

Application June 1, 1931, Serial No. 541,365

36 Claims. (Cl. 35—5)

This invention relates to apparatus for illustrating the various bodies of the universe, for indicating the relationship of the sun and its planets, their relative movements, their relationship to the stars, constellations and other star systems. It also relates to an apparatus by which the relationship of the various bodies of the universe may be determined for any time period within any determined range of years, the position of the meridian and horizon with reference to any particular point at any particular time and the relative positions of the celestial bodies apparent to a person located at any given point on the earth.

By means of this invention, the visible sky from any selected point on the surface of the earth for any date and hour, in any selected year, may be conveniently and clearly exemplified. The apparatus also simply and clearly may be used to illustrate the apparent rising and setting of the stars, planets and sun. The apparatus may also illustrate why the circum-polar stars are never at any time below the horizon. In addition to demonstrating the relative motion of the planets, the apparatus also illustrates the actual positions of the planets as well as their apparent position with reference to the stars. It also simply and plainly shows why some of the planets are called morning stars and others are called evening stars, as well as showing when and how certain planets become so-called morning stars and certain others become so-called evening stars. It also shows the variation in length of daylight at various times of the year and illustrates why the earth is caused to undergo change of seasons. The apparatus also demonstrates the plane of the orbits and the inclination of this plane to the celestial equator and by showing the orbits of the planets and their changing relative positions explains why at times the planet Mars, for example, appears to be apparently advancing and at other times apparently receding with reference to the earth. The apparatus may also be used to illustrate the principles of sidereal time, solar time and the explanation of mean time. The apparatus may also be used to demonstrate the fundamentals of navigation; also how the latitude at any particular point may be simply and quickly determined; also why the altitude of the pole is equal to the latitude of the point of observation. The apparatus may also be used to illustrate, demonstrate and explain various other phenomena of the universe.

The main object of this invention is to provide a form of apparatus which will enable a person to readily understand the relationship of the celestial bodies, their movements, actual and apparent, and why and how the various phenomena above-mentioned occur. Other objects and advantages of this invention will be understood from the following description and accompanying drawings which illustrate a preferred embodiment thereof.

Figure 3:
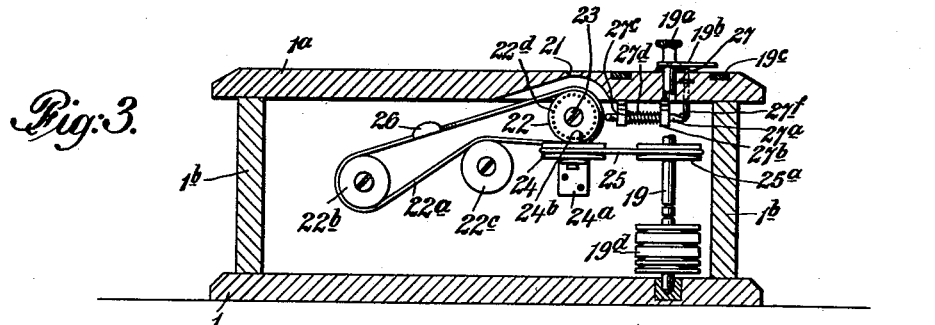
Figure 4:
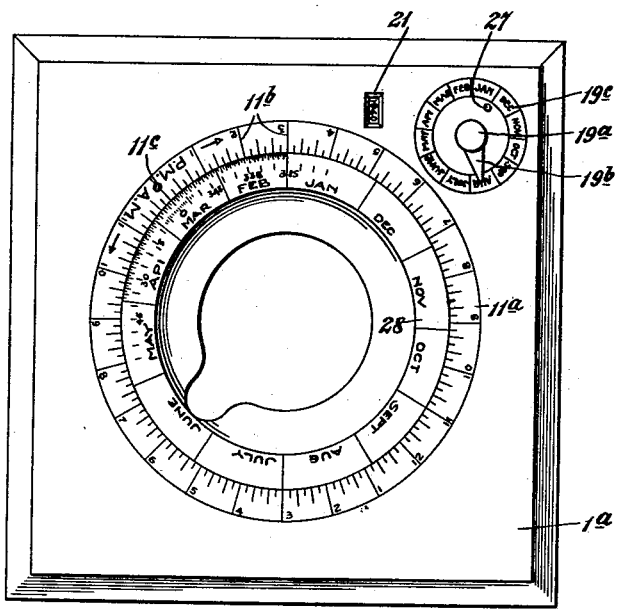
Figure 5:
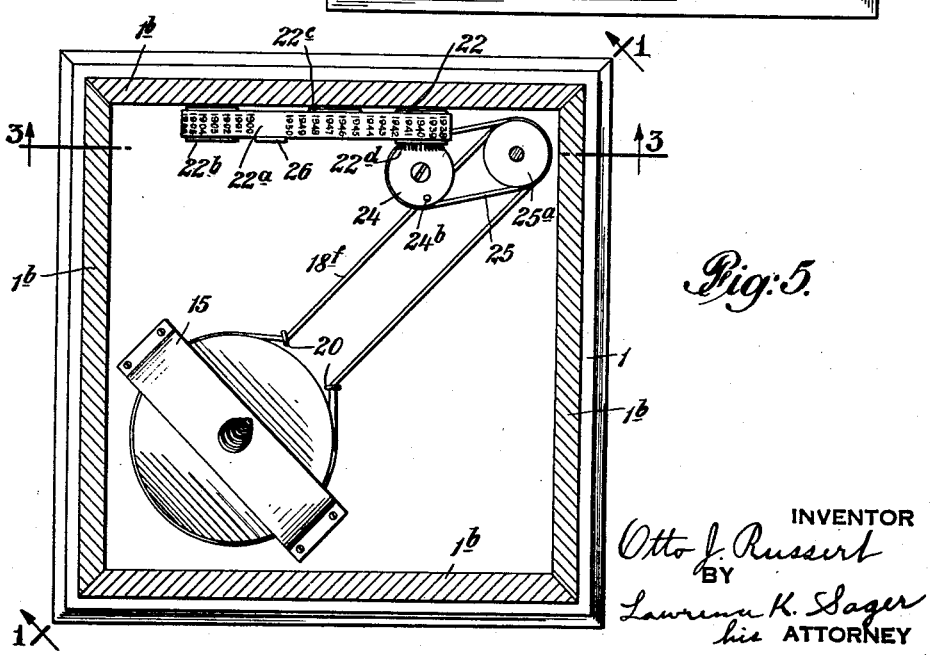

Fig. 1 is a side view of my improved apparatus with the supporting base shown in section on the line 1, 1 of Fig. 5; Fig. 2 is an enlarged vertical cross-sectional view showing a portion of the driving mechanisms for the planetary system; Fig. 3 is a vertical section of a portion of the supporting base showing a portion of the driving mechanism in elevation on the line 3, 3 in Fig. 5; Fig. 4 is a plan view of the top of the supporting base, the celestial globe and its parts being removed for the sake of clearness; and Fig. 5 is a plan view of the interior of the supporting base with the top cover removed.

The apparatus is supported by and partly contained within a box having a base 1, a top 1a and enclosing side walls 1b. On the top of the box is mounted a transparent globe 2 having a base portion 2a which is inserted within an opening in the cover 1a and held in place therein by suitable clamps 3 secured to the under surface of the cover 1a and extending inwardly to engage the rim of the base of the globe. The top of the globe represents the pole of the sky. Using this point as a center, a number of circles are drawn around the globe, say 10 degrees apart, which represent the declination lines 4 of the sky. The circle represented by the line 4a, half way between the upper and lower pole, represents the celestial equator. The equator is divided into 24 equal spaces and passing through these points from the north to the south poles are drawn circles represented by the lines 5 which are the right ascension circles of the sky. The right ascension lines are numbered at the celestial equator from 1 to 24 in Roman numerals, the lines VII to XVII being visible in Fig. 1. The initial line (0 and XXIV) is the vernal equinox and is opposite the line XII appearing in Fig. 1 of the drawings. The right ascension line XII is the autumnal equinox and the lines VI and XVIII are the solstices, these lines being so marked on the globe, marking of the autumnal equinox being shown on the drawings.

There is a circle 6 marked on the globe which in practice would be painted a distinctive color, such as red. This circle is the ecliptic. It crosses the celestial equator at the junction of right ascension XXIV and right ascension XII respectively and crosses the right ascension VI and XVIII at about 23½° above and below the equator respectively.

The stars 7 in their relative positions in the sky are designated on the surface of the globe, the most commonly known stars being indicated by applying their names to the globe, the names being omitted from Fig. 1 of the drawings for the sake of clearness. The magnitude of these stars may be indicated by the size of the dots or small circles, and are preferably also indicated as to their magnitude by different colors, such as white for the first magnitude, yellow for the second, red for the third, blue for the fourth and green for the fifth and sixth magnitudes. The positions of the different stars as located on the globe are taken from any recognized star catalogs and the United States Ephemeris and Nautical Almanac. As many as several thousand different stars can be located on this globe when say of 16 inches diameter and still show them clearly in their proper relative positions. There is also added on the surface of the globe, as indicated by the lines 8, the borders of the constellations and the name of each constellation is printed within these borders, certain of them being plainly shown in Fig. 1 of the drawings. These lines are preferably in black on the globe.

At the center of the globe is located in fixed position a small sphere 9 which represents the sun. There are also positioned within the globe in a manner to be hereinafter described other small spheres 10a, 10b, 10c, 10d, 10e and 10f representing the planets of the sun, Mercury, Venus, earth, Mars, Jupiter and Saturn respectively. The sizes of the spheres representing the sun and planets may be made such as to correspond to some extent with the actual relative sizes to give the observer a general idea thereof, although the exact relative sizes cannot be reproduced, owing to limitations of space within the globe. These spheres are so mounted in relative location to each other as to give a general idea of the relative distance between them and from the sun, but these distances cannot be represented accurately, owing to the limitations in size of the apparatus. The departure in showing these relative distances and sizes of the spheres from their actual relationships may be compensated for by means of diagrams pictured on the sides of the supporting base, one of these diagrams accurately showing the relative sizes of the sun and planets, and the other diagram showing accurately the relative distances from the sun. In Fig. 1 these spheres representing the sun and planets are shown located in the ecliptic plane, which is the plane in which the planets revolve around the sun.

A semi-circular metal strip or rod 11 extends around the exterior of the globe and is pivotally secured at one end to the top of the globe and is secured at its other end to a circular plate 11a which is movably mounted upon the top 1a of the base. This semi-circular rod represents the meridian circle. The plate 11a is well shown in Fig. 4, being the outer one of the two plates shown. The plate 11a is divided into 24 sections by the main division lines 11b which represent the 24 hours of the day. The meridian rod 11 is attached at one of the main division lines of this plate as indicated at 11c. One-half of the plate on one side of the point of attachment of the meridian represents the 12 morning hours and the other half represents the 12 evening hours. These halves of this plate are marked A. M. and P. M. on opposite sides of the point of attachment of the meridian, as shown in Fig. 4. The P. M. half of the circle has its main division lines numbered from 1 to 12 as they recede from the meridian and the A. M. half of the circle has its main divisions marked from 1 to 12 as it approaches the meridian line. Each main division of this circular plate is subdivided into smaller divisions on the inner rim thereof, the smallest sub-division on the drawings indicating 5 min-intervals. Of course, smaller divisions than 5 mins. may be used, if desired. The meridian rod 11 is graduated in degrees of the circle from 0° at the celestial equator to 90° at the North Pole and similarly from the celestial equator towards the South Pole.

A circular rod 12 completely encompasses the globe and is fastened at one point to a clamp 12a which is slidably mounted upon the meridian 11 and secured thereto at any desired position by the thumb screw 12b which is threaded through the clamp 12a and impinges upon the meridian rod. This circular element 12 represents the horizon. The horizon circle 12 may be adjusted to its proper position on the meridian 11 so as to correspond to the latitude of point of observation on the earth. For example, if the observer were located in a latitude of 50°, the zenith at that point would be 50° above the celestial equator, and 40° from the pole. Therefore, the correct position of the horizon circle would be obtained by adjusting the same on the meridian so that it had an angle of inclination to the celestial equator of 40°; that is, for any given latitude, the horizon circle is adjusted at an angle to the celestial equator which equals the difference between 90° and the latitude of the point of observation.

Within the supporting box of the apparatus is located mechanism for adjustment of the planets to their heliocentric position for any desired year, month and day selected, within a moderate range of years. From a support in the bottom of the base a rod 13 extends at an angle to the base and extends through an opening in the globe and supports at its inner end the sphere 9 representing the sun. The angle of this supporting rod for the sun with reference to the supporting base is about 66½°, being the difference between 90° and the angle of the ecliptic to the celestial equator. Movably mounted upon the rod 13 is a series of telescoping tubes 13a, 13b, 13c, 13d, 13e and 13f, the smallest one 13a encircling the rod 13, the next larger 13b to 13f encircling each other in the order of their lettering. The inner tube 13a carries a rod 14a which supports the planet 10a, which is Mercury, the rod 14a being bent at a slight angle to its supporting tube so as to be spaced from the sun by an amount representing its distance therefrom. Similarly, supporting rods 14b to 14f are respectively connected to the tubes 13b to 13f and respectively support the planets 10b to 10f, these rods being bent at angles to position the planets in the ecliptic plane at distances from the sun which indicates in a general way their relative positions therefrom. The outer tube 13f is suitably supported in proper angular position at its upper end by a support 15 which is of inverted U shape and having ts lower ends secured to the base 1. The tube 13f is seated in an opening in the middle upper part of the U support, thus permitting its rotation therein. This support is well shown in Figs. 1 and 5.

The telescoping tubes all extend downwardly through the support 15, the smallest tube 13a extending the greatest distance downwardly along the rod 13, and the remaining tubes a correspondingly shorter distance. The smallest tube 13a is supported upon the rod 13 by a washer 16 which in turn is held in place on the rod or shaft by a pin 16' below the washer and passing through the rod 13. On the lower end of the smallest tube 13a is mounted a circular driving disk or pulley 17a of comparatively small diameter. Similarly, the lower ends of the remaining tubes 13b to 13f have mounted thereon pulleys 17b to 17f. These pulleys are spaced from each other by intervening washers. The pulleys each have a semi-circular groove on their peripheries for receiving a driving belt or cord, these being respectively indicated as 18a, 18b, 18c, 18d, 18e and 18f. The diameters of these pulleys differ from each other and are made such as to give the proper relative motion to the planets, according to the speed with which they travel around the sun, excepting the pulleys 17e and 17f which are controlled from another part of the driving shaft. The driving shaft 19 for the cords or belts is a vertical shaft mounted at one corner of the box and pivotally supported in the top and bottom of the base frame. This shaft is adapted to be turned by a thumb-piece 19a at the top of the shaft and above the cover 1a. The shaft also carries above the cover 1a a pointer 19b which travels over a circular scale 19c located in fixed position on the face of the cover 1a. This scale is divided into 12 main divisions which represent the 12 months of the year, the name of the months being indicated on this scale, as shown in Fig. 4. These main divisions representing months are not equal to each other, but are proportioned to represent the apparent travel of the sun along the ecliptic during the respective months.

On the shaft 19 is mounted a wide pulley 19d having four grooves to receive the cords 18a to 18d. The shaft 19 is also provided with two grooves above the pulley 19d to receive the two cords 18e and 18f. In order to increase the peripheral contact of the cords on the pulleys 17a to 17f, a series of guide supports 20 having eyes at their upper ends are fixed upon the base and mounted quite close to the driven pulleys. The driving cords are passed through the eyes of these supports as indicated in Figs. 1 and 5 in their passage from the driven pulleys to the driving pulley 19d and shaft 19. It is evident that when the shaft 19 is turned by the thumb-piece 19a and adjusted so that the pointer 19b indicates a certain month on the scale 19c, the driving cords and pulleys will adjust the position of the planets so that they have a relative position corresponding to that month, the driving gear being properly relatively proportioned.

In view of the fact that the orbits of the planets and their speed of travel in these orbits are different from each other and that their relative positions from day to day and year to year vary, it is necessary not only to provide for adjustment of their positions according to months and days, but also as to any particular year to be considered. The adjustment for any particular year within a moderate range of years is taken care of by the mechanism next to be described. The cover 1a is provided with a small slot 21 near the plate 19c. Below this slot is a small pulley 22 located in a vertical plane and mounted on a pin 23 supported from one side of the supporting base. A belt 22a passes over this pulley 22 and extends to a similarly mounted pulley 22b. A similarly mounted guide wheel or pulley 22c is located under the belt to increase the peripheral contact of the belt 22a with the pulleys 22 and 22b. This belt is divided into a number of small sub-divisions, each of which represents one year and the various years covered by the range of operation of the mechanism are marked on the belt in these sub-divisions as indicated in Fig. 5, so that as the belt successively passes the slot 21, any selected year will show through this slot, as indicated in Fig. 4. Immediately below the pulley 22 and to one side thereof is mounted another pulley 24 in a horizontal plane and supported on a small shaft which in turn is supported by the bracket 24a secured to the side of the box. The pulley 24 carries on its upper face an upwardly extending pin 24b located near its periphery. On the inner face of the pulley 22 are located a series of inwardly extending pins 22d. These pins are arranged in a circle near the periphery of the pulley 22 and are spaced from each other at such distance that the movement of the pulley an angular amount corresponding to the distance between the pins will cause the indicator belt 22a to be moved the amount of one division thereon. When the pulley 24 is turned, its pin 24b will successively engage each of the pins 22d and cause it to move the belt 22a the distance of one pulley division per each revolution of the pulley 24. The pulley 24 is grooved in its circumference to receive a driving cord or belt 25 which in turn is driven by a grooved pulley 25a, which latter is mounted upon and fixed to the shaft 19. The pulleys 24 and 25a are of the same diameter. It therefore follows that one revolution of the shaft 19 by the thumb-piece 19a will cause the year belt 22a to be moved a distance corresponding to the space of one year.

In order to initially adjust and relate the mechanism to the indicators so as to have their proper relations with reference to the position of the planets, it is necessary that when a certain year is exposed in the slot 21 and the pointer 19b indicates a certain month and day of a month, the various pulleys must be so related to each other that upon the selected day, month and year, the planets will assume a proper relative position to each other and to the sun corresponding to that day, month and year. The proper adjustment of the position of the planets for any selected day, month and year may be taken from the United States Ephemeris and Nautical Almanac. Evidently, after the initial correct adjustment of the parts is secured, it follows that whenever the position of the planets for any particular day, month and year is desired, it may be obtained by turning the thumb-piece 19a until the indicator belt is brought to the desired year through the slot 21 and the pointer 19b brought to the proper day and month on the indicator plate 19c. In order to prevent the indicator belt 22a from over-running its range of years and thereby causing the parts to assume incorrect relative positions, the indicator belt is provided with a stop to limit its movement beyond a certain position in either direction. In providing for this stop, it is desirable to also stop the turning of the thumb-piece 19a so that continued turning of it after the indicator belt is stopped, will not cause slippage of the driving means and throw the parts out of proper relationship. On one edge of the belt 22a and at the part thereof where the years covering the extreme limits come together, is fixed a projection 26 in the form of a hump with inclined edges as shown in Fig. 3. This hump should preferably cover a lineal space on the indicator belt equivalent to two years spacing. Within the dial plate 19c a vertical hole at the division line between January and December, is occupied by a vertically movable pin 27. This pin is normally held in position by the end of a longitudinal movable rod 27a supported on the underside of the cover 1a by brackets 27b and extending in a direction so that the other end of the rod 27a comes quite close to the periphery of the pulley 22 and in the path of the projection 26. On the rod 27a is a washer 27c held from displacement in one direction by a pin through the rod. Between the washer and one of the supports 27b is located a helical spring 27d for the purpose of forcing the rod in a direction towards the pulley 22. A pin 27e through the rod normally engages one of the brackets 27b to prevent the rod from impinging upon the periphery of the pulley 22. The rod 27a has an inclined surface at 27f near the end of the pin 27 so that when the rod is pushed outwardly, it will raise the pin 27 and cause the upper end of the same to come in the path of the pointer 19b. It will be apparent that when the indicator belt 22a has come to the end of its year range in one direction, one of the inclined sides of the hump 26 will engage the rod 27a and force the same outwardly against the pressure of the spring 27d and cause the pin 27 to be elevated and prevent the thumb-piece 19a from being turned beyond a certain position when its pointer comes against the pin. When the thumb-piece is turned in the reverse direction, the hump 26 on the indicator belt will be moved from under the end of the rod 27a and thus permit the dropping of the pin 27 and thus permit the use of the mechanism in the proper direction.

It will be recalled that the scale plate 11a to which the meridian is secured, is movably mounted on the top of the cover 1a. Within this scale plate is another scale plate 28 which is fixed to the top of the cover 1a and located within and adjacent to a scale plate 11a. The scale plate 28 is divided into 12 main divisions to represent the months of the year and each division is marked with the name of the month represented as indicated in Fig. 4. These main divisions are not equally spaced, but are proportioned to represent the apparent travel of the sun along the ecliptic during the respective months. The outer edge of the plate 28 is sub-divided into divisions representing a day of each month. Within the day division is another scale, the smallest division of which represents one degree of the 360° in a circle.

It will be appreciated that by reason of the rods 14a to 14f passing through an opening in the globe, the globe itself cannot be turned for adjustment of its position. Consequently, it is necessary to adjust the plate 28 to properly relate itself to the position of the globe. The proper position of the plate 28 is such that the 22nd day of March is in a meridian plane containing the autumnal and vernal equinox and is at that side of the globe where the vernal equinox is located. In view of the fact that Fig. 1 is a view of the globe in a diagonal direction with reference to the base, it will be apparent that the correct position of the plate 28 for the position of the globe shown, will be when the 22nd of March is on the diagonal of Fig. 4 extending from the upper left-hand corner to the lower right-hand corner. The 22nd day of March is also the point at which the degrees marked on the plate 28 is the zero or 360° point, the numbering of the degrees being counter-clockwise, as is also the order of the months on the plate 28. The plate 19c is fixed in a position so that the months designated thereon correspond in angular position to the months on plate 28 when in its proper fixed position with reference to the globe. Also the months on the plate 19c are designated in counter-clockwise direction the same as on the plate 28. In order to secure the pointer 19b in proper position on the shaft 19, so as to conform to the position of the planets, one sights through the globe on a line from the earth to the sun; and determines the day on dial 28 where that line lays. The pointer 19b is then fixed on the shaft 19 in such a position that it indicates the same day on the plate 19c as was determined on the plate 28 by sighting as described.

Now with reference to the use of the globe for positioning the meridian 11 and the horizon 22 so as to determine the visible portion of the sky from a point of observation at a particular time, it has already been explained how the horizon circle 12 is adjusted on the meridian rod 11 according to the latitude of the point of observation. This having been done, a point is selected on the plate 11a to correspond with the time of observation. Then this plate is moved so that that selected point is opposite the day of the month on the scale plate 28 which corresponds to the day and month of the time of observation. When this adjustment is completed, the meridian rod 11 will then be located in a plane through the meridian of the point of observation. Likewise, the horizon circle 12 will then be in a position corresponding to the horizon around the point of observation. This means that that portion of the globe located on one side of the horizon circle 12 corresponds to the sky which is observable from the point of observation at the particular hour of the day and month selected. It thus follows that if a person using the globe sights through the globe from the opposite side, he will see the stars located on the half of the globe for which the adjustment was made, in the same relationship as they appear to the person when looking at the sky. By sighting from a point opposite the meridian 11, such a person may note the position of any star with reference to the meridian and horizon and then by looking at the sky itself, immediately locate that star in the sky, because it will be in a position corresponding to the position shown by the adjustment of the apparatus. The position of the planets in the visible sky may also be quickly determined by this apparatus after the adjustments above described have been made. Thus if it be desired to locate the position of one of the planets as it appears in the sky, a person will sight through the globe on a line passing through the earth and the planet whose position is to be determined. This line of sight will strike the globe at a certain point and by noting that point with reference to the meridian rod 11, the horizon circle 12, or to other stars, the location of the planet as it appears in the sky can be quite accurately and quickly determined.

It will be apparent to those somewhat versed in astronomy how this improved apparatus may be used in various ways to explain and illustrate the various phenomena referred to at the beginning of this specification and such explanations need not be discussed at length herein.

Although I have described a preferred embodiment of this invention, it will be understood that various modifications may be made therein without departing from the scope thereof.

It will also be apparent that various additions may be superimposed upon the apparatus to show and illustrate various phenomena of the celestial bodies to any extent of refinement and amplification desired. These additions may be conveniently made when the apparatus is embodied in a large size. For example, the planets Uranus, Neptune and Pluto are not represented in the apparatus as described, but could be so represented and supported and driven in the same manner as described with reference to the planets shown. Likewise, if desired, the relative position of the moon to the earth and various other bodies and their characteristics could be represented or explained with reference to the apparatus shown in the drawings.

I claim:

1. The combination of a globe, spheres within the globe representing the sun and planets located in a plane corresponding to the ecliptic plane at an angle to the celestial equator, said celestial equator being indicated on the globe in a horizontal plane, said ecliptical plane being indicated on said globe by a line around said globe, and indications on the globe representing the stars.

2. The combination of a globe, spheres within the globe representing the sun and planets located in a plane corresponding to the ecliptic plane at an angle to the celestial equator, said celestial equator being indicated on the globe in a horizontal plane, said ecliptical plane being indicated on said globe by a line around said globe, and indications on the globe representing the stars, and means for moving the spheres corresponding to the planets in their orbits at speeds corresponding to the speeds of the planets.

3. The combination of a globe, spheres within the globe representing the sun and planets located in a plane corresponding to the ecliptic plane at an angle to the celestial equator, said celestial equator being indicated on the globe, indications on the globe representing the stars, and mechanism and indicating means for positioning the planets in their relative positions to the sun and to each other at any selected time.

4. The combination of a plurality of elements representing the sun and planets, a driving mechanism connected with said elements, and indicating means whereby the position of said planets with reference to the sun and to each other may be adjusted to correspond with any selected year and portion thereof.

5. The combination of a plurality of spheres representing the sun and planets, a driving mechanism connected with said spheres, indicating means whereby the position of said planets with reference to the sun and to each other may be adjusted to correspond with any selected year and portion thereof, and a globe enclosing said sphere, said globe having stars indicated thereon.

6. The combination of a globe fixed in position, indications thereon representing the stars of the sky, a movable meridian rod embracing said globe and adjustable around the same with that portion representing the polar axis of the universe as a center, and an indicating scale for showing the correct adjusted position of said rod so that the same will lie in a meridian plane passing through the zenith of the point of observation for any given time of the year and time of the day.

7. The combination of a globe, indications thereon representing the stars of the sky, a meridian rod embracing said globe, said rod and globe being relatively adjustable with that portion representing the polar axis of the universe as a center of rotation, an indicating scale for showing the correct adjusted position of said rod so that the same will lie in a meridian plane passing through the zenith of the point of observation for any given time of the year and time of the day, and a horizon rod encircling the globe adjustable with reference to said meridian rod to compensate for changes in latitude.

8. The combination of a transparent globe, indications thereon representing stars of the sky, a movable meridian rod embracing the globe and adjustable around the same with that portion representing the polar axis of the universe as a center of rotation, an indicating scale for showing the correct adjusted position of said rod so that the same will lie in a meridian plane passing through the zenith of the point of observation for any given time of the year and time of day, spheres within the globe representing the sun and planets in their relative positions, a driving gear for moving said planet spheres in their orbits around the sun to different relative locations, and an indicating scale for showing the time at which the planets occupy any given relative position to each other and to the sun and stars.

9. The combination of a transparent globe, indications thereon representing the stars of the sky, a movable meridian rod embracing the globe and adjustable around the same with that portion representing the polar axis of the universe as a center of rotation, an indicating scale for showing the correct adjusted position of said rod so that the same will lie in a meridian plane passing through the zenith of the point of observation for any given time of the year and time of day, spheres within the globe representing the sun and planets in their relative positions, a driving gear for moving said planet spheres in their orbits around the sun to different relative locations, an indicating scale for showing the time at which the planets occupy any given relative position to each other and to the sun and stars, and a horizon rod encircling the globe adjustable with reference to said meridian rod for compensating for changes in latitude.

10. The combination of a globe, indications thereon representing the stars of the sky, a meridian rod embracing said globe, said rod and globe being relatively adjustable with that portion representing the polar axis of the universe as a center of rotation, an indicating scale for showing the correct adjusted position of said rod so that the same will lie in a meridian plane passing through the zenith of the point of observation for any given time of the year and time of the day, a horizon rod encircling the globe adjustable with reference to said meridian rod to compensate for changes in latitude, spheres within the globe representing the sun and planets in their relative positions, a driving gear for moving the spheres representing the planets in their orbits around the sun at different speeds corresponding to the speed of the planets, said spheres being located in the ecliptic plane at an angle to the celestial equator of the globe, and an indicating scale for showing the time at which the planets occupy any given relative position to each other and to the sun and stars.

11. The combination of a globe fixed in position, indications thereon representing the stars of the sky, a movable meridian rod embracing said globe and adjustable around the same with that portion representing the polar axis of the universe as a center, a fixed circular scale the center of which corresponds to the polar axis of the universe, said scale having indications thereon, the sub-divisions of which represent the time of a year and positioned with reference to said sphere so that the time of the equinox of said scale lies in the equinoctial meridian plane, and a movable scale in juxtaposition to said fixed scale, said movable scale being subdivided into the time intervals of a day, and said meridian rod being connected to said movable scale.

12. The combination of a globe fixed in position, indications thereon representing the stars of the sky, a movable meridian rod embracing said globe and adjustable around the same with that portion representing the polar axis of the universe as a center, a fixed circular scale the center of which corresponds to the polar axis of the universe, said scale having indications thereon, the sub-divisions of which represent the time of a year and positioned with reference to said sphere so that the time of the equinox of said scale lies in the equinoctial meridian plane, a movable scale in juxtaposition to said fixed scale, said movable scale being subdivided into the time intervals of a day, said meridian rod being connected to said movable scale, and a horizon rod encircling the globe adjustable with reference to said meridian rod to compensate for changes in latitude.

13. The combination of a globe fixed in position, indications thereon representing the stars of the sky, a movable meridian rod embracing said globe and adjustable around the same with that portion representing the polar axis of the universe as a center, a fixed circular scale the center of which corresponds to the polar axis of the universe, said scale having indications thereon, the sub-divisions of which represent the time of a year and positioned with reference to said sphere so that the time of the equinox of said scale lies in the equinoctial meridian plane, a movable scale in juxtaposition to said fixed scale, said movable scale being sub-divided into the time intervals of a day, said meridian rod being connected to said movable scale, spheres within the globe representing the sun and planets in their relative positions, a driving gear for moving said planet spheres in their orbits around the sun to different relative locations, and an indicating scale for showing the times at which the planets occupy any given relative position to each other and to the sun and stars.

14. The combination of a globe fixed in position, indications thereon representing the stars of the sky, a movable meridian rod embracing said globe and adjustable around the same with that portion representing the polar axis of the universe as a center, a fixed circular scale the center of which corresponds to the polar axis of the universe, said scale having indications thereon, the sub-divisions of which represent the time of a year and positioned with reference to said sphere so that the time of the equinox of said scale lies in the equinoctial meridian plane, a movable scale in juxtaposition to said fixed scale, said movable scale being sub-divided into the time intervals of a day, said meridian rod being connected to said movable scale, a horizon rod encircling the globe adjustable with reference to said meridian rod to compensate for changes in latitude, spheres within the globe representing the sun and planets in their relative positions, a driving gear for moving said planet spheres in their orbits around the sun to different relative locations, and an indicating scale for showing the time at which the planets occupy any given relative position to each other and to the sun and stars.

15. The combination of a globe fixed in position, indications thereon representing the stars of the sky, a movable meridian rod embracing said globe and adjustable around the same with that portion representing the polar axis of the universe as a center, a fixed circular scale the center of which corresponds to the polar axis of the universe, said scale having indications thereon, the sub-divisions of which represent the time of a year and positioned with reference to said sphere so that the time of the equinox of said scale lies in the equinoctial meridian plane, a movable scale in juxtaposition to said fixed scale, said movable scale being sub-divided into the time intervals of a day, said meridian rod being connected to said movable scale, spheres within the globe representing the sun and planets in their relative positions, a driving gear for moving the spheres representing the planets in their orbits around the sun at different speeds corresponding to the speed of the planets, said spheres being located in the ecliptic plane at an angle to the celestial equator of the globe, and an indicating scale for showing the time at which the planets occupy any given relative position to each other and to the sun and stars.

16. The combination of a globe fixed in position, indications thereon representing the stars of the sky, a movable meridian rod embracing said globe and adjustable around the same with that portion representing the polar axis of the universe as a center, a fixed circular scale the center of which corresponds to the polar axis of the universe, said scale having indications thereon, the sub-divisions of which represent the time of a year and positioned with reference to said sphere so that the time of the equinox of said scale lies in the equinoctial meridian plane, a movable scale in juxtaposition to said fixed scale, said movable scale being subdivided into the time intervals of a day, said meridian rod being connected to said movable scale, and a horizon rod encircling the globe adjustable with reference to said meridian rod to compensate for changes in latitude, spheres within the globe representing the sun and planets in their relative positions, a driving gear for moving the spheres representing the planets in their orbits around the sun at different speeds corresponding to the speed of the planets, said spheres being located in the ecliptic plane at an angle to the celestial equator of the globe, and an indicating scale for showing the time at which the planets occupy any given relative position to each other and to the sun and stars.

17. The combination of a fixed sphere representing the sun, spheres representing the planets movable in orbits around the sun to different locations relative to the sun and to each other, an operating mechanism for actuating the planets to their different relative positions, and an indicating device operatively connected with said mechanism for showing the time at which the planets occupy any given relative position to each other and to the sun.

18. The combination of a fixed sphere representing the sun, spheres representing the planets movable in orbits around the sun to different locations relative to the sun and to each other, an operating mechanism for actuating the planets to their different relative positions, and an indicating device operatively connected with said mechanism for showing the time at which the planets occupy any given relative position to each other and to the sun, said device comprising an indicator for showing the year and a related indicator for showing the time of each year at which the planets occupy their said positions.

19. The combination of a fixed sphere representing the sun, spheres representing the planets movable in orbits around the sun to different locations relative to the sun and to each other, an operating mechanism for actuating the planets to their different relative positions, and an indicating device operatively connected with said mechanism for showing the time at which the planets occupy any given relative position to each other and to the sun, said device comprising a movable member having indications of the years thereon and a second indicator having the months of the year indicated thereon.

20. The combination of a fixed sphere representing the sun, spheres representing the planets movable in orbits around the sun to different locations relative to the sun and to each other, an operating mechanism for actuating the planets to their different relative positions, and an indicating device operatively connected with said mechanism for showing the time at which the planets occupy any given relative position to each other and to the sun, said device comprising a stop for automatically limiting the movement of the planets at the limitations of the range of time indication of said device.

21. The combination of a transparent globe, indications thereon representing stars of the sky, a fixed sphere representing the sun within the globe at its center, spheres representing the planets movable in orbits around the sun to different locations relative to the sun and to each other and to the stars, an operating mechanism for actuating the planets to their different relative positions, and an indicating device showing the time at which the planets occupy any given relative position to each other and to the sun and stars.

22. The combination of a transparent globe, indications thereon representing stars of the sky, a fixed sphere representing the sun within the globe at its center, spheres representing the planets movable in orbits around the sun to different locations relative to the sun and to each other and to the stars, and operating mechanism for actuating the planets to their different relative positions, and an indicating device operatively connected with said mechanism for showing the time at which the planets occupy any given relative position to each other and to the sun and stars, said device comprising an indicator for showing the year and a related indicator for showing the time of each year at which the planets occupy their said positions.

23. The combination of a transparent globe, indications thereon representing stars of the sky, a fixed sphere representing the sun within the globe at its center, spheres representing the planets movable in orbits around the sun to different locations relative to the sun and to each other and to the stars, an operating mechanism for actuating the planets to their different relative positions, and an indicating device operatively connected with said mechanism for showing the time at which the planets occupy any given relative position to each other and to the sun and stars, said device comprising a movable member having indications of the years thereon and a second indicator having the months of the year indicated thereon.

24. The combination of a support, a transparent globe mounted thereon at its base, indications on the globe representing stars of the sky, a sphere in the center of the globe representing the sun, spheres representing the planets movable about the sun in their orbits in the ecliptic plane, an operating mechanism for actuating the planets in their orbits at different speeds corresponding to the speed of the planets, and an indicating device mounted on said support for showing the time at which the planets occupy any given relative position to each other and to the sun and stars, said device showing the year and time of the year of such positions.

25. The combination of a globe fixed in position, indications thereon representing the stars of the sky, a movable meridian rod embracing said globe and adjustable around the same with that portion representing the polar axis of the universe as a center, an indicating scale for showing the correct adjusted position of said rod so that the same will lie in a meridian plane passing through the zenith of the point of observation for any given time of the year and time of the day, and a horizon rod encircling the globe fixed in position relatively to said meridian rod and movable therewith.

26. The combination of a base, a globe supported upon said base, indications on the globe representing the stars of the sky, a horizon rod encircling said globe and adjustable around the same with that portion representing the polar axis of the universe as a center, a circular scale fixed to said base the center of which scale coincides with the polar axis of the universe, said scale having indications thereon representing portions of a year, and a movable scale in juxtaposition to said fixed scale, said movable scale having indications representing portions of a day, and said horizon rod being in fixed mechanical relation to said movable scale and movable therewith.

27. The combination of a base, a globe supported upon said base, indications on the globe representing the stars of the sky, a horizon rod encircling said globe, said rod and globe being relatively movable with that portion representing the polar axis of the universe as a center, a circular scale on said base the center of which scale coincides with the polar axis of the universe, said scale being fixed relatively to said globe, a second scale in juxtaposition to said first named scale, said first scale having indications thereon representing portions of a year and said second scale having indications representing portions of a day, said horizon rod being in fixed mechanical relation to said second scale, and means whereby said horizon rod may be adjusted to compensate for changes in latitude.

28. The combination of a base, a globe supported upon said base, indications on the globe representing the stars of the sky, a horizon rod encircling said globe, said rod and globe being relatively movable with that portion representing the polar axis of the universe as a center, a circular scale on said base the center of which scale coincides with the polar axis of the universe, said scale being fixed relatively to said globe, a second scale in juxtaposition to said first named scale, said first scale having indications thereon representing portions of a year and said second scale having indications representing portions of a day, said horizon rod being in fixed mechanical relation to said second scale, spheres within the globe representing the sun and planets in their relative positions, and a driving gear for moving said planet spheres in their orbits around the sun to different relative positions.

29. The combination of a base, a globe supported upon said base, indications on the globe representing the stars of the sky, a horizon rod encircling said globe, said rod and globe being relatively movable with that portion representing the polar axis of the universe as a center, a circular scale on said base the center of which scale coincides with the polar axis of the universe, said scale being fixed relatively to said globe, a second scale in juxtaposition to said first named scale, said first scale having indications thereon representing portions of a year and said second scale having indications representing portions of a day, said horizon rod being in fixed mechanical relation to said second scale, spheres within the globe representing the sun and planets in their relative positions, a driving gear for moving said planet spheres in their orbits around the sun to different relative positions, and an indicating scale for showing the time at which the planets occupy any given relative position to each other and to the sun and stars.

30. The combination of a base, a globe supported upon said base, indications on the globe representing the stars of the sky, a horizon rod encircling said globe, said rod and globe being relatively movable with that portion representing the polar axis of the universe as a center, a circular scale on said base in fixed position relatively to said globe, said scale having indications thereon representing portions of a year, and a second scale in juxtaposition to said first scale, said second scale having indications thereon representing portions of a day, one of said scales being adjustable relatively to the other, and said horizon rod being in fixed mechanical relation to said second scale.

31. The combination of a globe, spheres within the globe representing the sun and planetary bodies in their general relative positions, means for actuating said spheres in their respective orbits and at speeds corresponding to the speeds of the respective planets, said globe having indications thereon representing the stars, a horizon rod encircling the globe, said rod being adjustable to different positions around the globe with that portion representing the polar axis of the globe as a center, and indicating means for showing the time at which the stars and planets are visible on one side of said horizon rod in any adjusted position thereof.

32. The combination of a base, a transparent globe on said base, indications on said globe representing the stars of the sky, spheres within said globe representing the sun and planets located in a plane corresponding to the ecliptic plane at an angle to the celestial equator, said celestial equator being indicated on the globe and located in a horizontal plane, a vertical operating shaft projecting through the top of said base, and mechanism within the base driven by said shaft for moving the spheres corresponding to the planets at speeds corresponding to the speed of the planets.

33. The combination of a base, a transparent globe on said base, indications on said globe representing the stars of the sky, spheres within said globe representing the sun and planets located in a plane corresponding to the ecliptic plane at an angle to the celestial equator, said celestial equator being indicated on the globe and located in a horizontal plane, a vertical operating shaft projecting through the top of said base, mechanism within the base driven by said shaft for moving the spheres corresponding to the planets at speeds corresponding to the speed of the planets, and indicating means operatively connected with said shaft for showing the time at which the planets occupy any given relative position to each other and to the sun and stars.

34. The combination of a base, a transparent globe on said base, indications on said globe representing the stars of the sky, spheres within said globe representing the sun and planets located in a plane corresponding to the ecliptic plane at an angle to the celestial equator, said celestial equator being indicated on the globe and located in a horizontal plane, an operating shaft projecting through said base, mechanism within the base driven by said shaft for moving the spheres corresponding to the planets at speeds corresponding to the speed of the planets, a scale plate on the base having sub-divisions of a year marked thereon, a pointer actuated by movement of said shaft and passing over the scale of said plate for indicating the sub-division of a year corresponding to the position of the planets, and an indicating device supported by the base and actuated by movement of said shaft for indicating the year corresponding to the position of the planets.

35. The combination of a base, a transparent globe on said base, indications on said globe representing the stars of the sky, spheres within said globe representing the sun and planets located in a plane corresponding to the ecliptic plane at an angle to the celestial equator, said celestial equator being indicated on the globe and located in a horizontal plane, an operating shaft projecting through said base, mechanism within the base driven by said shaft for moving the spheres corresponding to the planets at speeds corresponding to the speed of the planets, a circular scale plate on the base having its center coinciding with the axis of said shaft and having sub-divisions of a year marked thereon, a pointer secured to said shaft and passing over the scale of said plate for indicating the sub-division of a year corresponding to the position of the planets, and an indicating device supported by the base and actuated by movement of said shaft for indicating the year corresponding to the position of the planets.

36. The combination of a base, a transparent globe on said base, indications on said globe representing the stars of the sky, spheres within said globe representing the sun and planets located in a plane corresponding to the ecliptic plane at an angle to the celestial equator, said celestial equator being indicated on the globe and located in a horizontal plane, a vertical operating shaft projecting through the top of said base, mechanism within the base driven by said shaft for moving the spheres corresponding to the planets at speeds corresponding to the speed of the planets, a circular scale plate on top of the base having sub-divisions of a year marked thereon and having its center coinciding with the axis of said shaft, a pointer secured to said shaft and passing over the scale of said plate for indicating the sub-division of a year corresponding to the position of the planets, and an indicating device supported by the base and actuated by movement of said shaft for indicating the year corresponding to the position of the planets and having the year indication visible at the top of said base.

OTTO J. RUSSERT.